United States Patent [19]
Coblentz

[11] 3,729,906
[45] May 1, 1973

[54] HARVESTING SYSTEM USING TREE FRAME

[76] Inventor: Robert C. Coblentz, P.O. Box 2645, Winter Haven, Fla. 33880

[22] Filed: Sept. 7, 1971

[21] Appl. No.: 178,177

[52] U.S. Cl. ..................56/1, 47/42, 56/328 TS
[51] Int. Cl. ............................................A01g 19/00
[58] Field of Search .................56/DIG. 1, 328 R, 56/328 TS, 1; 47/42

[56] References Cited

UNITED STATES PATENTS

| | | | |
|---|---|---|---|
| 890,967 | 6/1908 | Davey et al. | 47/42 |
| 1,389,932 | 9/1921 | Bosmajian | 47/42 |
| 3,040,477 | 6/1962 | June | 47/42 |
| 3,392,517 | 7/1968 | Nye | 56/328 TS |
| 3,439,481 | 4/1969 | Hall | 56/328 R |
| 3,584,446 | 6/1971 | Bernshausen | 56/328 TS |
| 3,414,314 | 12/1968 | Martin | 56/328 TS |
| 3,452,528 | 7/1969 | Fairchild et al. | 56/328 R |

FOREIGN PATENTS OR APPLICATIONS

| | | | |
|---|---|---|---|
| 259,043 | 1/1949 | Switzerland | 47/42 |
| 358,909 | 9/1922 | Germany | 47/42 |
| 13,615 | 12/1910 | France | 47/42 |

Primary Examiner—Russell R. Kinsey
Assistant Examiner—J. A. Oliff
Attorney—Robert W. Duckworth et al.

[57] ABSTRACT

The present invention relates to a harvesting method and apparatus for harvesting fruit, and the like, from trees. It includes a frame connected between limbs of a tree in a manner that shaking the frame shakes all of the limbs connected thereto and means for gripping the frame and shaking it. The frame is permanently installed in the tree at predetermined points on the limbs of the tree, so that shaking one point of the frame will shake all of the limbs at predetermined points for loosening the fruit located in the tree. A method is also provided for attaching the frame in the trees either by drilling holes in the limbs or placing a clamp around the limbs at predetermined points and connecting frame arms with bolts either extending through the holes drilled in the tree or through clamps around the limbs.

5 Claims, 12 Drawing Figures

Patented May 1, 1973

INVENTOR.
Robert C. Coblentz
BY Duckworth & Hobby
ATTY'S.

INVENTOR.
Robert C. Coblentz
BY Duckworth & Hobby
ATTY'S.

Patented May 1, 1973

INVENTOR.
Robert C. Coblentz
BY Duckworth & Hobby
ATTY'S.

HARVESTING SYSTEM USING TREE FRAME

BACKGROUND OF THE INVENTION

The present invention relates to a harvesting method and apparatus and especially to a harvesting method and apparatus utilizing a permanent frame installed in tree connecting limbs of a tree at predetermined points so the frame may be shakened to shake all the limbs at predetermined points.

In the past the picking of citrus fruits other than by hand and with aids such as cherry pickers has presented many problems because of the fact that the fruit is very strongly held to the trees and thus takes considerable force to remove without damage to the fruit or to the trees.

Many approaches have been devised to remove citrus fruit by machine harvesting but these have frequently been copied from harvesters used for other types of fruit and heretofore have had only limited success. One approach has been to shake the trees with a mechanical shaker which grasps the tree trunk and rapidly shakes the fruit loose while a net of some type is used to catch the fruit that falls from the tree. This type of device has met with only limited success on those types of fruits that are more loosely held and can do considerable damage to the trees. Attempts have been made to find chemicals to apply to the trees for loosening the fruit but such chemicals have to date been expensive or have not proven safe. Another approach has been to blow the fruit off the trees with big wind producing machines, and has problems similar to the shaking machine in that the trees are damaged by limbs and the like being blown off the tree, along with the fruit. Other devices have tried raking the fruit off with long armed mechanical rakes moved through the trees in various manners in order to pull the fruit from the trees but this method also results in damage to the trees by pulling limbs therefrom and by bruising and scraping the fruit and limbs. One group of devices has used large groups of spindles or borers that are rotated and moved into the trees to cut or twist the fruit loose, and various devices for cutting the limbs holding the fruit have been suggested, as has the application of a D.C. voltage to the trees to loosen the fruit.

One prior art machine has continuously operated cutter blades located behind a notched guide to direct the tree limbs into the cutter. A groove at the end of the notch has a guard to prevent the premature entry of a limb into the cutting area and a roller is used to help guide the limbs.

Finally, U.S. Pat. No. 3,392,517 teaches a tree shaking machine adapted to engage the trunk of a tree including inserting a spiked member into the tree and shaking it with an array of frequencies in an attempt to reach the resonant frequency of the tree. This latter patent however, fails to recognize the importance of shaking predetermined limbs at predetermined points at resonant frequencies, rather than the tree trunk, and also fails to recognize the importance of varying the stroke and force of the shaker.

It is accordingly one object of the present invention to provide a harvesting apparatus for harvesting fruit or nuts, or the like, from trees in groves in which a permanent frame has been installed in each tree of the grove interconnecting major limbs of the tree at predetermined points, and placed so that a shaking apparatus passing down rows of the grove can engage one or more points of the tree frame and shake the frame shaking all of the major limbs at predetermined or selected points to which the frame is attached, and which may also shake the frame in a manner to vary frequency, stroke or amplitude and force over a suitable range to produce a resonance.

SUMMARY OF THE INVENTION

The present invention relates to harvesting systems and especially to a harvesting system adapted for use for trees such as citrus fruit trees from which it is particularly hard to remove the fruit other than by hand. The apparatus includes a frame attached in each tree of a grove and having arms connecting the major limbs of a tree so that shaking the main connecting member of the frame will shake all of the limbs at predetermined or selected points and also includes means for removably gripping the frame for shaking the limbs, which means provides for shaking at varying frequencies as well as varying the stroke or amplitude and force of the shaker. The frame is such that it can be installed in varying sections and can be easily bolted together and bolted to each limb either through holes drilled in the limbs or clamps around the limbs.

A method for removing fruit from fruit trees includes gripping a frame connected between a plurality of limbs of a tree at predetermined points along the limbs and shaking the frame to shake each limb connected to the frame at those predetermined points that the frame is connected, for loosening the fruit located on the limbs. The method provides for varying singly or plurally the frequency stroke and the force of the shaker as desired. A method is also provided for attaching the frame to the tree which includes drilling an opening through the major limbs of the tree at predetermined points therein, passing attaching members through the openings and of attaching the arms of the frame to the limb. The preferred point of attaching tree frame arms to the limbs is usually approximately one-third of the length of the limbs starting from the beginning of a limb from the trunk of the tree.

BRIEF DESCRIPTION OF THE DRAWINGS

Other objects, features and advantages of this invention will be apparent from the written description and from the drawings in which.

DESCRIPTION OF THE PREFERRED EMBODIMENTS

Figure 1:
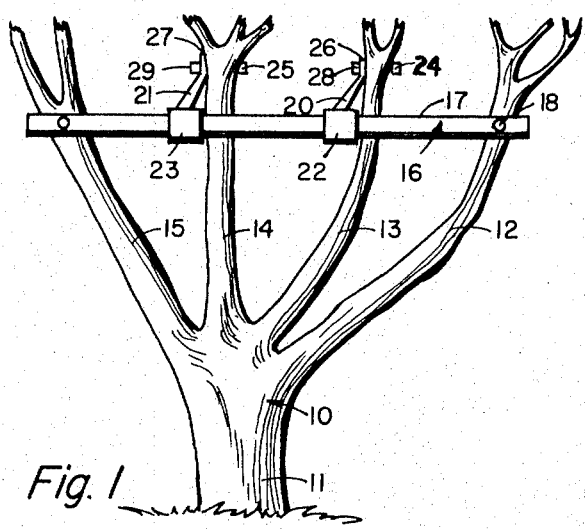
FIG. 1 illustrates an elevational view of a tree having the frame of the present invention attached thereto.

Referring now to FIG. 1, a tree 10 can be seen having a trunk 11 and a plurality of limbs 12, 13, 14 and 15. A frame 16 has a main connecting member 17 connected between the limbs 12 and 15 and attached to the limbs by bolts 18 passing through the main connecting frame member 17 which could be a galvanized steel pipe, or the like, as desired, and also passing through the limbs 12 and 15 through a bolt hole bored therein and bolted to the limbs. A pair of frame arms 20 and 21 are connected to the main connecting member 17 by arm joint attaching members 22 and 23, and are also attached to limbs 13 and 14 respectively by bolts 24 and 25 passing through the openings in limbs 13 and 14, which openings have been drilled therein, and then passing through a flattened portion 26 and 27 of the frame arms 20 and 21 respectively. Nuts 28 and 29 attach the bolts for holding the frame arms 20 and 21 to the limbs 13 and 14, thus a rigid frame which may be made of galvanized steel pipe or any rigid material has been attached to the tree at predetermined points of the limbs of the tree so that grasping the main connecting member 17 will allow limbs 12, 13, 14 and 15 to be shaken simultaneously at the exact shaking points in which the frame 16 is connected to each limb. The connecting points are selected as being the approximate point where the resonance of the limbs can be most easily reached by shaking and generally is approximately one-third the length of the limb starting from the trunk 11 of the tree 10. This point can also be determined by individually shaking each limb at several points to determine the best point for removing the fruit from the tree.

It should be noted at this point that while four major limbs have been shown of the tree 10, the frame could consist of arms connecting any number of limbs of a tree and would normally connect all the major limbs of each tree of the grove whereby the shaker could go through the grove, grasping one or two frames at a time and shaking all the major limbs of the tree causing the fruit to fall therefrom to the ground where they can then be picked up. The frame 16 is a permanent installation in the tree, which stays there the year round, and does not harm the tree.

Figure 2:
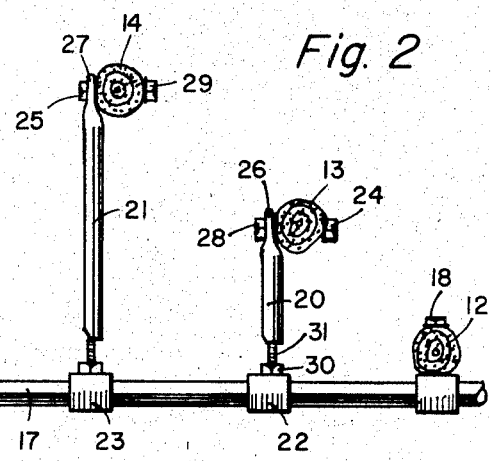
FIG. 2 illustrates a top sectional view of the frame attached to the tree of FIG. 1.

FIG. 2 more clearly illustrates the frame 16 having a shaking or main connecting member 17 attached to limbs 12 and 15 by bolts 18 passing therethrough and connecting to the main connecting member 17. A short frame arm 20 attaches by means of a joint 22 to the main connecting member 17 and has a flattened end portion 26 which has an opening therein for a bolt 24 to pass through and also to pass through an opening in the limb 13 attaching the frame arm 20 and the limb 13 together with a nut 28. The joint is illustrated having a nut 30 along with threaded member 31 for adjustably attaching the frame arm 20 to the joint 22, as will be explained in more detail in connections with FIGS. 3 and 4. A longer frame arm 21 is attached to the main connecting member 17 by means of a connecting member 23, and is attached to limb 14 by a bolt 25 and nut 29 passing through an opening in the limb 14 and an opening in the frame arm 21 at a flattened portion 27.

Figure 3:
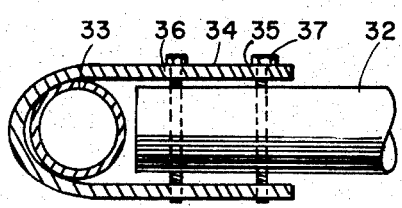
FIG. 3 shows a sectional view of one means of attaching the frame members together.
Figure 4:
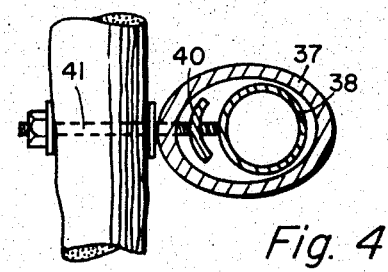
FIG. 4 shows a sectional view of a second means of attaching frame member to tree limb.

FIGS. 3 and 4 show other means for connecting frame members together, with FIG. 3 showing an arm 32 connected to the main connecting member 33 by a U-shaped joint member 34 which slides over the main connecting member 33 and over the end of the frame arm 32 and having a pair of bolts 35 and 36 passing through both sides of the U-shaped member 34 and through the frame arm 32 at two separate points. Bolts 35 and 36 can be anchored at the other side by a pair of nuts or can have the U-shaped member 34 threaded for receiving the ends of the bolts, for locking the frame arm 32 and the main connecting member 33 together. This joint has the particular advantage of allowing an inexpensive connection of the arms of the frame together, which connections can be disassembled or changed as desired, or added at a later date, should it become desirable to add a frame arm to a limb that has become sufficiently large to accept one.

FIG. 4 shows a second method in which an oval member 37 is attached to a main connecting member 38 and has a threaded arcuate member 40 connected to a threaded bolt 41 so that the member 40 can be threaded against the oval joint member 37 and the threaded member 41 can be tightened against the main connecting member 38. The bolt 41 is then attached to a tree limb, or the like, with washers to either side if desired and may be locked with a nut threaded on bolt 41.

Figure 5:
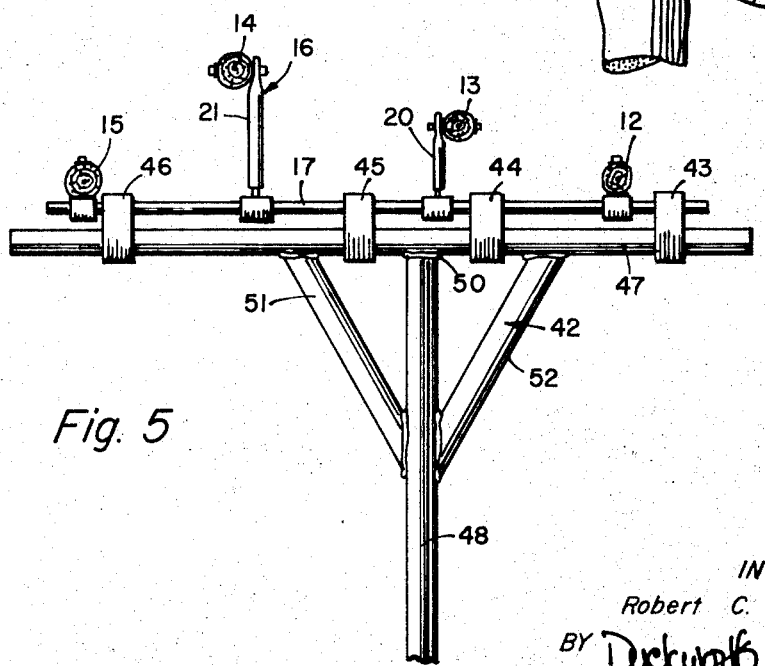
FIG. 5 shows a sectional view of the frame attached to a tree in accordance with FIG. 2 having a shaker gripping the frame for shaking the limbs of a tree.

FIG. 5 shows a view of the frame similar to FIG. 2 except having shaking arm 42 of the shaker attached thereto at four points by four removably gripping members 43, 44, 45 and 46, which are removably gripping the main connecting member 17 so that the shaker arm 42, horizontal frame member 47 is held parallel to the main connecting member 17 during the shaking of the frame 16. It will of course be clear that while four gripping members 43 through 46 have been illustrated, any number including one can be utilized to shake the frame as desired without departing from the spirit and scope of the present invention. The frame 16 can also be seen connected to limbs 12, 13, 14 and 15 with a frame arm 20 connecting main connecting member 17 to the limb 13 and a frame arm 21 connecting the main connecting member 17 to the limb 14. The shaker head assembly has a main shaker member 48 connected to the horizontal frame member 47, such as by welding at 50, and may also have reenforcing or strengthening members 51 and 52 welded between the shaker arm 48 and frame member 47, whereby the arm 48 may swing the arm 47 into position or allow the grippers 43, 44, 45 and 46 to contact the main connecting member 17 to grip it during the shaking operation.

The method of the present invention includes taking the shaking head 42 through a grove and engaging each frame 16 in each tree of the groove and shaking it in order to shake each limb or each major limb in the tree at the predetermined point to which the frame has been connected to the limb. The shaking may be performed by varying the frequency, stroke or amplitude and/or force of the shaking in order to reach a resonance of the limbs to loosen the fruit of the trees which will then drop to the earth. The frame is installed in each tree by first drilling a hole in the limbs or placing a clamp around the limbs where the frame is to be connected at the predetermined points which are determined as being most suitable to produce a resonance in that particular limb; then attaching the main connecting member 17 between two limbs and attaching each of the arms to the main connecting member 17 and to the limbs that they are going to extend to, such as by passing a bolt, or the like, through the opening drilled in the limb for passing the bolt to attach the frame arm and limb together.

Figure 6:
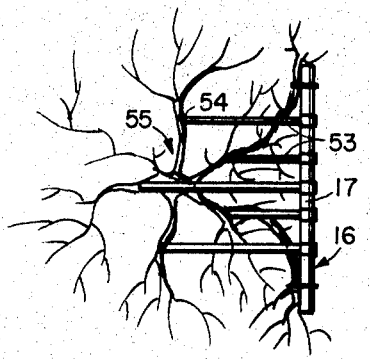
FIG. 6 shows top elevation view of a pair of trees having frames attached thereto, as might be located in a grove for simultaneous shaking.
Figure 6:
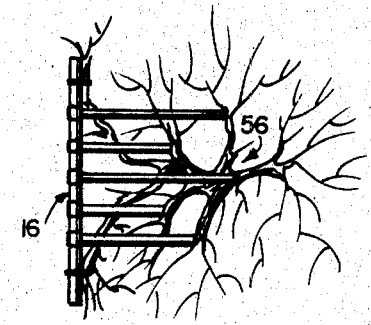
Figure 7:
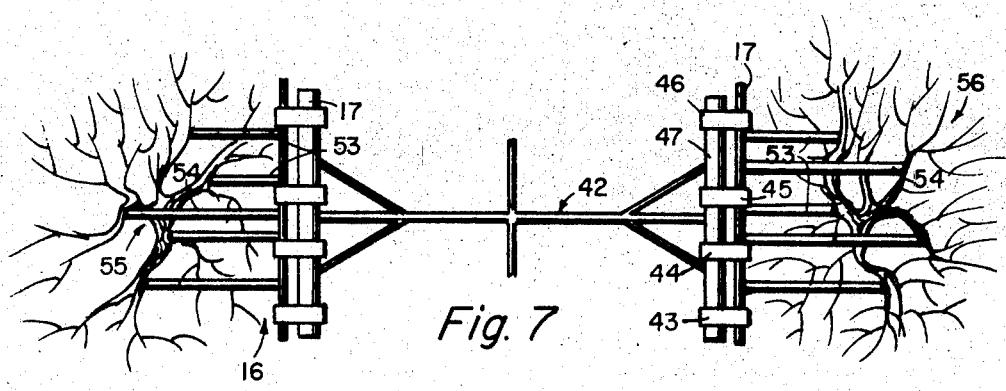
FIG. 7 shows a top elevation view of the trees and frame of FIG. 6 having a shaker simultaneously engaging both frames.

FIGS. 6 and 7 more clearly illustrate how the frames could be attached relative to the groove alignment in which groove the trees are side by side in rows and the shaker moves between two rows shaking two trees at each stop in the row as it goes down the row. That is, the main connecting member 17 has a plurality of frame arms 53 attached to limbs 54 in trees 55. The main connecting member 17 is selected to face a tree 56 parallel to a row. The shaker arm 42 can either grip one side first and the other side next, or it can be made to have two arms 42 for shaking two trees side by side simultaneously. Thus the shaker can move down the middle of two rows shaking trees in each of the rows as it moves along to harvest an entire grove.

It should also be understood that devices for catching the falling oranges can also be provided within the scope of the present invention.

The shaker 42 in FIG. 7 is shown as having horizontal arm 47 and gripping members 43 through 46 engaging the main connecting member 17 of the frame 16 for shaking the limbs of the tree.

Figure 8:
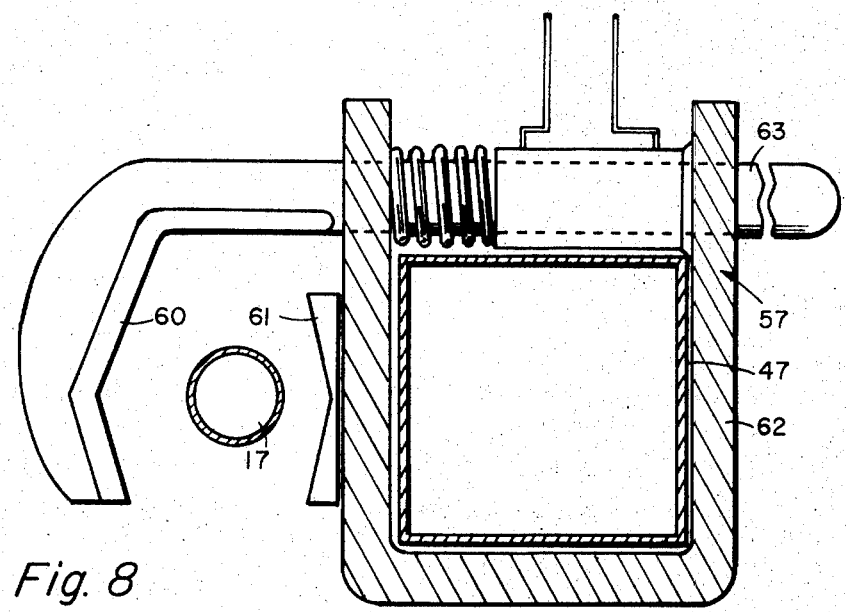
FIG. 8 shows a sectional view of a gripping device of the shaker for gripping the shaker to the frame.

The present invention contemplates any means desired for attaching the shaker 42 to the arm 17. One such system is illustrated in FIG. 8 in which the horizontal frame member 47 has the gripping member 57 attached thereto, and has a gripping jaw or jaws 60 and 61 attached to with the jaw 60 being movable on the frame 62 of the removable gripping member 57, and having a plunger rod 63 which may be hydraulically or electrically actuated with a hydraulic cylinder or solenoid, as desired. This gripper can thus grip the main connecting member 17 for quickly attaching shaker 42 to the frame 16 or main connecting member 17 for shaking all the major limbs of the fruit tree, or the like, simultaneously, for loosening the fruit thereon.

Figure 9:
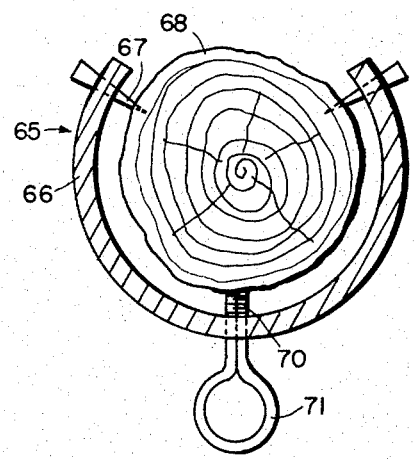
FIG. 9 shows an elevational view of an alternate limb clamp.
Figure 10:
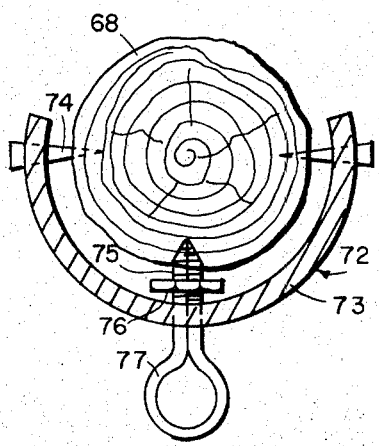
FIG. 10 shows an elevational view of an alternate limb clamp.
Figure 11:
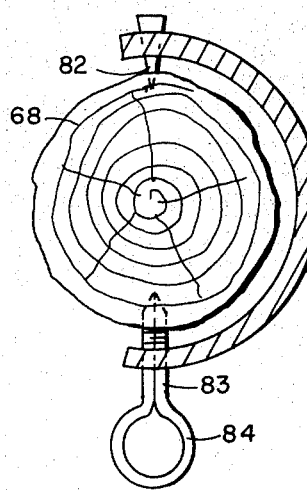
FIG. 11 shows an elevational view of yet another limb clamp.

Referring now to FIGS. 9, 10 and 11, there are illustrated three limb clamps for clamping frame members to limbs without drilling holes through the limbs. In FIG. 9, the limb clamp 65 is illustrated having an arcuate bracket 66 with a pair of spikes 67 in either end thereof for engaging a limb 68. A threaded bolt or cotter pin shaped member 70 is located in the approximate center of the bracket 66 and has a circular member or ring 71 for engaging a frame member of frame 16 thereinto. Thus the bracket can be slid over a limb, the spikes 67 driven into the limb 68 and the threaded portion 70 tightened down onto the limb for locking the clamp to the tree. The arm of the frame can then be slid into the opening of the circular portion 71 and locked in position.

FIG. 10 shows a clamp 72 having a U-shaped bracket 73 with a pair of spikes 74 passing through the ends thereof which may be driven into a limb 68. Threadable member 75 has a nut 76 threaded thereon and a ring 77 adapted for attaching a frame member thereto. The limb is engaged by spikes in three directions and held by the clamp which is then attached to the frame.

In FIG. 11 the limb attaching member 80 has a U-shaped bracket 81 with a spike 82 for engaging one side of the limb 68 and the other side having member 83 passing through the bracket 80 for engaging limb 68 which has a ring 84 for engaging an arm of the frame. The limb connecting members illustrated in FIGS. 9, 10 and 11 are examples of preferred ways of attaching members of a frame being placed in a tree to individual limbs and are preferably usable for attaching frame members other than the main connecting members 17 which would normally require more rigid and stronger attachment to the limbs.

Figure 12:
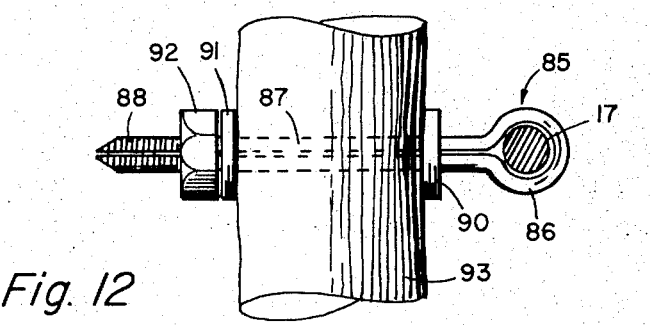
FIG. 12 shows an elevational view of a limb, and main connecting member attaching member for inserting through holes drilled in limb for attaching the main connecting member thereto.

Turning now to FIG. 12, a means for attaching the main connecting member 17 to limbs of a tree is illustrated which means may also be utilized for the other members of the frame. Attaching member 85 which is similar to a cotter pin has a ring 86 and an elongated portion 87 formed of two pieces which has a threaded end 88. The elongated portion 87 is slid through a hole drilled in limb 93 with a pair of washers 90 and 91 at either side thereof and a threaded nut 92 is threaded onto the threaded portion 88 to lock the member onto the limb. The main connecting member 17 may then be slid into the opening of the ring 86 and may be locked thereto. The main connecting member 17 may be locked in any manner desired, but one preferred way would be to crimp the main connecting member 17 to either side of the member 85 ring 86 so that it cannot slide in the ring 86 because of the blocking action of the crimped portions.

The frame can be made of any material desired with steel being the preferred material. Successful experiments have been performed using ¾ inch galvanized steel pipe for the frame arms along with ½ inch x-bolts of different size and different lengths. The length of each bolt will of course be determined by the size of the limb and may be 2, 4, 6, 8 inches or longer. The frame arm of the present invention can also be made adjustable by telescoping 1 inch pipe inside a 1¼ inch pipe and having holes drilled therein for attaching cotter pins, bolts or other attaching means for attaching two pipes together through holes drilled therein.

It is also anticipated that any shaking means desired may be utilized, but the preferred invention will have a shaker adapted to vary the frequencies of the shaker to reach a resonance of the limbs of the tree by shaking the frame, and it is also anticipated that the shaker can be adapted to vary the force and the stroke of the shaker to give a greater adaptability for reaching resonances of each tree. It is also important in this connection that the frame be connected at the correct points on each limb, inasmuch as each limb has a resonance area or a point in which the fruit can be most easily removed by shaking. Thus, the invention overcomes many prior art problems of removing fruit, such as oranges, from orange trees by shaking the trunks which has proved generally unsuccessful, and also overcomes the disadvantages of attempting to shake each limb individually, as has been suggested in the prior art.

Accordingly, the present invention is not to be construed as limited to the particular forms disclosed herein, since these are to be regarded as illustrative rather than restrictive.

I claim:

1. The method of removing fruit from a fruit tree, comprising the steps of gripping a frame fixedly connected to a plurality of limbs of said tree at predetermined points with a gripping and shaking means and shaking said frame with said gripping and shaking means to shake each said limb connected thereto at said predetermined points whereby fruit may be loosened from said limbs.

2. The method according to claim 1 in which said step of shaking said frame includes shaking said frame over a range of frequencies.

3. The method according to claim 2 in which the step of shaking includes shaking said frame over a range of amplitudes.

4. The method according to claim 3 in which said step of shaking includes shaking said frame at varying levels of force.

5. The apparatus according to claim 1 in which said gripping includes gripping the frames of two trees simultaneously and shaking both frames simultaneously.

* * * * *